United States Patent
Liang et al.

(10) Patent No.: US 10,414,679 B2
(45) Date of Patent: Sep. 17, 2019

(54) INTEGRATED DEVICE AND METHOD FOR ELIMINATING INITIAL RUNOFF POLLUTION

(71) Applicant: ZHEJIANG UNIVERSITY, Hangzhou, Zhejiang (CN)

(72) Inventors: Xinqiang Liang, Zhejiang (CN); Guifen Hua, Zhejiang (CN); Zhirong Wang, Zhejiang (CN); Kejin Zhou, Zhejiang (CN); Meiru Li, Zhejiang (CN); Yulei Yu, Zhejiang (CN); Yi Jin, Zhejiang (CN); Liping Lou, Zhejiang (CN); Qi Lin, Zhejiang (CN); Hua Li, Zhejiang (CN); Guangming Tian, Zhejiang (CN)

(73) Assignee: ZHEJIANG UNIVERSITY, Hangzhou, Zhejiang (CN)

( * ) Notice: Subject to any disclaimer, the term of this patent is extended or adjusted under 35 U.S.C. 154(b) by 0 days.

(21) Appl. No.: 15/554,712

(22) PCT Filed: Jan. 17, 2017

(86) PCT No.: PCT/CN2017/071352
§ 371 (c)(1),
(2) Date: Dec. 29, 2017

(87) PCT Pub. No.: WO2017/124995
PCT Pub. Date: Jul. 27, 2017

(65) Prior Publication Data
US 2018/0170778 A1 Jun. 21, 2018

(30) Foreign Application Priority Data

Jan. 18, 2016 (CN) .......................... 2016 1 0030882
Jan. 18, 2016 (CN) .......................... 2016 1 0032819
Jan. 18, 2016 (CN) .......................... 2016 1 0033456

(51) Int. Cl.
*A01G 22/22* (2018.01)
*A01G 25/16* (2006.01)
(Continued)

(52) U.S. Cl.
CPC .............. *C02F 3/327* (2013.01); *A01G 22/22* (2018.02); *A01G 25/162* (2013.01);
(Continued)

(58) Field of Classification Search
CPC ......... A01G 22/22; A01G 25/162; C02F 1/00; C02F 2101/105; C02F 2101/16; C02F 2103/001; C02F 2209/42; C02F 3/327
See application file for complete search history.

(56) References Cited

U.S. PATENT DOCUMENTS

2014/0124424 A1* 5/2014 Chai ...................... E03F 5/103
210/170.03

FOREIGN PATENT DOCUMENTS

| CN | 103437577 A | 12/2013 |
| CN | 104355410 A | 2/2015 |

(Continued)

OTHER PUBLICATIONS

Wang, CN 104563266 English Machine Translation, pp. 1-7 (Year: 2015).*

*Primary Examiner* — Claire A Norris (57) ABSTRACT

An integrated eliminating device and its method for initial runoff pollution is provided, wherein a plurality of the water receiving pipes for collecting initial runoff are gathered and connected to the first water reservoir, one end of the water inlet pump is connected with the first water reservoir via the water receiving pipes, and the other end of the intake pump is connected with an water inlet opening of the rice field; the rice field is divided into a plurality of sub-parcels in a shape of long stripes, a regulating gate is set. An outlet of the rice
(Continued)

field is communicated with the second water reservoir and which is communicated with the water inlet opening of the rice field via the reflux pump.

5 Claims, 4 Drawing Sheets

(51) Int. Cl.
    *C02F 3/32*     (2006.01)
    *C02F 101/10*     (2006.01)
    *C02F 101/16*     (2006.01)
    *C02F 103/00*     (2006.01)

(52) U.S. Cl.
    CPC .... *C02F 2101/105* (2013.01); *C02F 2101/16* (2013.01); *C02F 2103/001* (2013.01); *C02F 2209/42* (2013.01)

(56) References Cited

FOREIGN PATENT DOCUMENTS

| | | |
|---|---|---|
| CN | 104782447 A | 7/2015 |
| CN | 104891661 A | 9/2015 |
| CN | 105417867 A | 3/2016 |
| CN | 105421566 A | 3/2016 |
| CN | 105507221 A | 4/2016 |
| CN | 105668797 A | 6/2016 |
| CN | 105684837 A | 6/2016 |
| CN | 205367893 U | 7/2016 |
| CN | 205475135 U | 8/2016 |
| JP | 2004041213 A | 2/2004 |

\* cited by examiner

Fig. 8

INTEGRATED DEVICE AND METHOD FOR ELIMINATING INITIAL RUNOFF POLLUTION

CROSS REFERENCE OF RELATED APPLICATION

This is a U.S. National Stage under 35 U.S.C 371 of the International Application PCT/CN2017071352, which claims priority under 35 U.S.C. 119(a-d) to CN201610030882.5, filed Jan. 18, 2016; CN201610032819.5, filed Jan. 18, 2016 and CN201610033456.7 filed Jan. 18, 2016.

BACKGROUND OF THE PRESENT INVENTION

Field of Invention

The present invention belongs to the field of agricultural non-point source pollution control, and particularly relates to an integrated device and method for eliminating initial runoff pollution.

Description of Related Arts

In recent years, a large amount of researches are performed on the loss characteristics of the farmland runoff contaminants in China and other countries. The research showed that the peak values of the concentrations of nitrogen and phosphorus in the runoff appear in half an hour even the shorter time after the runoff is induced. Afterwards, the concentration of nitrogen and phosphorus in the runoff is mainly related to that of the rainwater itself. It is important for mitigating the agricultural non-point source pollution to control the discharge of the initial runoff during the period with a higher concentration. As to the ecological environment, the rice field can be defined as a shallow water wetland which greatly influences the transformation processes of nitrogen and phosphorus in the surface runoff with the function of regulating discharge of excess water and circulation of nutrient in the agricultural production base. Thus, taking advantage of making full use of the initial runoff generated by high niche from the rice field as an effective method can maximize the reduction of the pollutant output.

A Chinese patent with an application number of CN201410625297.0 discloses an ecological ditch system with interception function for controlling rice-field non-point source pollution, comprising two parts: the ecological ditch and paddywetland; wherein the wall of the ecological ditch is provided with green plant, the bottom is provided with emerging plant, and rice is planted in the paddy wetland whose resource of the irrigation water and the fertilizer is water flowing from the upstream and through the rice field and the ecological ditch. The system plays a certain role in contaminants elimination, but the utilization efficiency is limited by the capacity of the ditch and the rice field, which results in the system cannot maximize the reduction of contaminants during the storm period.

A Chinese patent application with an application number of CN201510245277.5 discloses a method for controlling the rice field non-point source pollution and an artificial paddy wetland system, wherein the rice field wetland system improves the utilization rate of nitrogen and phosphorus. The system structure takes the rice field as an upstream, and a paddy wetland is constructed in the drain downstream of the rice field beside a river. This patent makes good use of the blocking, absorbing and utilizing effects to the contaminants of the water body by the rice field itself, so as to reduce the contaminants in the discharged water, but there is an efficiency problem similar to the previous patent.

A Chinese patent application with an application number of CN201510183146.9 discloses a collection and irrigation system for initial runoff from an agricultural land, comprising: drainage ditches, diversion canals, drains ditch weirs, initial runoff sensors, electric catchment valves, catchments, lift pumps, agricultural irrigation pipelines and farmland irrigation nozzles; wherein a square drainage channel used in non-flush period is built on an upper position of drain weir, the electric catchment valves controlled by the initial runoff sensor is set on the diversion canals, so as to collect the initial runoff for daily agricultural irrigation. The system accumulates the initial runoff through the sump for subsequent irrigation, but there is also a problem that the storage capacity is limited during the storm period.

A Chinese patent application with an application number of CN201510890262.4 discloses a system for rice field non-point source pollution control, and recovery and utilization of nitrogen and phosphorus. When the rice field is drained, the water flows through each unit, adsorbs nitrogen and phosphorus through their adsorbates, and further reduces the concentration of nitrogen and phosphorus in water by the artificial wetland absorption for to achieve the purpose of reducing the risk of water eutrophication; when rice fields are irrigated, the water flows through the adsorption unit into the irrigation ditch, the absorbing substances release the nitrogen and phosphorus substances adsorbed to the irrigation water by desorption for reutilization in the rice field. Compared with the former systems mentioned above, this patent is capable of improving the eliminating efficiency of the contaminants by cycling the tailwater. However, the complex facilities and failure analysis to the pollutant concentration in different stages of the rice field ecosystem requests efficiency to be further improved.

SUMMARY OF THE PRESENT INVENTION

An object of the present invention is to solve the problems in the conventional art and provide an integrated device for eliminating initial runoff pollution. The "eliminating" in the present invention refers to utilizing the rice field ecological system to decrease the nutrients contamination such as N and P in the initial runoff, so as to reduce their harm to water eutrophication. The initial runoff in the present invention refers to the water flow including high-concentration contaminants generated except the direct evaporation, plant interception, underground infiltration and depression filling on the ground surface during the rainfall process.

Specific technical solution adopted by the present invention is as follows.

An integrated device for eliminating initial runoff pollution, comprises: a plurality of water receiving pipes, a first water reservoir, a control device, an intake pump, a rice field, regulating gates, a second water reservoir, a reflux pump; an emptying valve, a first water level detection device, a second water level detection device and a third water level detection device;

wherein the plurality of the water receiving pipes for collecting initial runoff are gathered and connected with the first water reservoir, a first end of the intake pump is connected with the first water reservoir via the water receiving pipes, and a second end of the intake pump is connected with an water inlet opening of the rice field;

the rice field is divided into a plurality of sub-parcels in a shape of long stripes, each of the regulating gates is provided on each ridge of two adjacent sub-parcels, the regulating gates are in staggered arrangement, so as to ensure that initial runoff flowed from the water inlet opening is not capable of being discharged until flows across a longest distance;

an outlet of the rice field is connected with the second water reservoir, the second water reservoir is connected with the water inlet opening of the rice field via the reflux pump; the first water level detection device is provided in the first water reservoir, the second water storage detection device is provided in the rice field, the third water level detection device is provided in the second water reservoir; the control device is connected with the regulating gate, the intake pump; the reflux pump, the emptying gate, the first water level detection device, the second water level detection device and the third water level detection device, so as to control operating state thereof.

The runoff in the water receiving pipe is discharged into the first water reservoir for storage. The rice field divided by the plurality of sub-parcels in a shape of long stripes form a push stream ecological treatment system similar to an oxidation ditch, wherein the system can adopt a plug flow operation mode, i.e. continuously in charging and discharging, and can also adopt an accumulation treatment, i.e., discharging after charging into for a certain time. During rainfall process, with help of the water level detection devices set in different water reservoir and rice fields, reasonably utilizing the storage capacity from different sections in the system, a high-concentration initial runoff is stored into the system as much as possible.

Preferably, the integrated device for eliminating initial runoff pollution, further comprises: a first gate valve, a transcendental pipe, a second gate valve, a third gate valve, a contaminant concentration detection device, and a rain sensor connected with the control device; wherein the contaminant concentration detection device is connected with a gathered position of the water receiving pipe, the first water reservoir, the rice field and the second water reservoir, so as to detect runoff contaminant concentration at each position; the first gate valve for controlling water inlet is provided between the water receiving pipe and the first water reservoir, the first gate valve is controlled by the control device; the water receiving pipe on a frontend of the first gate valve is connected with the transcendental pipe, the second gate valve and the third gate valve which are controlled by the control device are provided on the transcendental pipe, the transcendental pipe on the front end of the second gate valve is connected with the water inlet opening of the rice field; the transcendental pipe between the second gate valve and the third gate valve is connected with the second water reservoir. Since solely relying on water level detection device, the amount of storage water should be increased as much as possible, but during the process of runoff, the concentration of contaminants in water cannot be monitored. If all of the low-concentration runoff is stored in the system, when high concentration runoff continues generating, it fails to store because of saturated storage capacity. Therefore, with the preferred scheme, it is possible to further increase the possibility of remaining storage capacity and to collect the high-concentration runoff water as much as possible.

Based on the above two schemes, some preferred schemes are further provided as follows, wherein the technical features without any conflict in the preferred schemes can be combined with each other.

Preferably a first sensor, a second sensor, and a third sensor are provided on the first water level detection device; wherein the first sensor, the second sensor, and the third sensor are respectively positioned on a height of an upper limit water level, a starting water level and a lower water level of the first water reservoir.

Preferably, the second water level detection device adopts a U-shaped pipe, opening a hole on one side of a pipe wall of the second water level detection device embedding this side into the rice field soil; and a second side thereof is suspended outside the ridge; a fourth sensor and a fifth sensor are provided on the second side which is suspended of the pipe in the second water level detection device; wherein the fourth sensor is provided 5-8 cm above a ground surface, and the fifth sensor is provided 2-4 cm above the ground surface.

Preferably, a sixth sensor and a seventh sensor are provided in the third water level detection device, and respectively provided on an upper water level and a lower water level of the second water reservoir.

Preferably, the integrated device for eliminating initial runoff pollution further comprises a rain sensor which is connected with the control device, the first gate valve for controlling water inlet is provided between the water receiving pipe and the first water reservoir, wherein the first gate valve is controlled by the control device. The water receiving pipe on the front end of the first gate valve is connected with the transcendental pipe, the second gate valve and the third gate valve which are controlled by the control device are provided on the transcendental pipe, the transcendental pipe on the front end of the second gate valve is connected with the water inlet opening of the rice field; the transcendental pipe between the second gate valve and the third gate valve is connected with the second water reservoir. The scheme is suitable for an improvement of the first scheme. Compared with the second scheme, the first scheme removes the contaminant concentration detection device and can be applied in areas with low rainfall, wherein a low-concentration water is not discharged, the runoff water can be stored as much as possible, so as to improve water utilization efficiency.

Preferably, a plurality of the regulating gates are opened and closed coordinatedly or singlely. It is possible to adjust the independence among the adjacent subfields. When plug flow is used for the runoff, the linkage opening mode can be adopted. When the gate is closed simultaneously or separately, the crop flooding situation of different sub-fields can be regulated.

Providing an integrated method for eliminating initial runoff pollution is another purpose of the invention, comprising steps of:

(1) disposing the water receiving pipes in a catchment of the initial runoff to make the initial runoff in the catchment converge into the first water reservoir;

(2) presetting the first gate valve closed in an initial state, the regulating gates all turned on and the emptying gates (12) turned off;

(3) when the rain sensor detects that current rainfall reaches a preset starting value and that a water level of the first water reservoir does not reach a first sensor on the first water level detection device, switching on the first gate valve by the control device, so as to discharge the initial runoff in the water receiving pipes into the first water reservoir for storage;

when the rain sensor detects that current rainfall reaches the preset starting value; the water level of the first water reservoir reaches the first sensor on the first water level detection device; and that a water level of the rice field reaches the fourth sensor on the second water level detection device and a water level of the second water reservoir does not reach the sixth sensor on the third water level detection device; turning off the first gate valve, turning on the second gate valve and turning off the third gate valve by the control device, so as to discharge the initial runoff in the water receiving pipes into the second water reservoir;

when the rain sensor detects that current rainfall amount reaches the preset starting value; the water level of the first water reservoir reaches the first sensor on the first water level detection device; and that the water level of the rice field reaches the fourth sensor on the second water level detection device and the water level of the second water reservoir reaches the sixth sensor on the third water level detection device; turning off the first gate valve, turning on the second gate valve and the third gate valve by the control device, so as to discharge the initial runoff in the water receiving pipes directly by a transcendental pipe; and when the rain sensor detects that current rainfall reaches a preset closing value, turning off the first gate valve, turning on the second gate valve and the third gate valve by the control device, so as to discharge the initial runoff in the water receiving pipes directly by the transcendental pipe;

(4) when the water level of the first water reservoir reaches the second sensor on the first water level detection device and the water level of the rice field does not reach the fourth sensor on the second water level detection device, starting the intake pump by the control device to discharge the initial runoff in the first water reservoir into the rice field; when the water level of the first water reservoir is lower than the third sensor on the first water level detection device, turning off the intake pump by the control device;

(5) during the rainfall process, emptying gate is set to intermittent open and close by the control device according to a water level on a surface of the rice field; when the water level of the rice field is over the fourth sensor on the second water level detection device, turning on the emptying gate to discharge the initial runoff into the second water reservoir for utilization of reflux; when the water level of the rice field does not reach the fourth sensor on the second water level detection device, turning off the emptying gate;

(6) when the water level of the second water reservoir reaches the sixth sensor on the third water level detection device and the water level of the rice field does not reach the fourth sensor on the second water level detection device, turning on the reflux pump by the control device, when the water level of the rice field reaches the fourth sensor on the second water level detection device, turning off the reflux pump by the control device; when the water level of the second water reservoir is lower than the seventh sensor on the third water level detection device, turning off the reflux pump by the control device;

(7) when the rain sensor detects that current rainfall is over, turning off the first gate valve and the emptying gate by the control device, turning on the intake pump and the reflux pump according to the water level on the surface of the rice field, so as to utilize the initial runoff for irrigation to achieve the function of eliminating contaminants.

Preferably, the preset starting value is set as the rainfall amount which leads the initial runoff to generate in the initial runoff catchment; the preset closing value is set as the rainfall a mount which makes the concentration of the contaminants of the initial runoff generated in the initial runoff catchment 2-5 times of a contaminants concentration in the rainfall.

As a preferred embodiment of the method mentioned above, the preset starting value is a rainfall amount which is capable of making the initial runoff gathering zone generated in the catchment area of the initial runoff; the preset turn-off value is a rainfall amount which is capable of making a concentration of the contaminants of the initial runoff generated in the catchment area of the initial runoff 2-5 times of a concentration of contaminants in the rainfall.

The beneficial effects of the invention are as follows. The initial runoff having high contaminant concentration and being great harm to the water body can be reasonably accumulated in the water reservoir and the irrigated utilization is carried out in the non-rainfall period, and the rice field is taken as an ecological wetland for eliminating. The specially designed rice field is capable of maximizing the retention time of runoff water by the specially designed rice field, so as to achieve the objects of eliminating the contaminants with a maximum amount.

These and other objectives, features, and advantages of the present invention will become apparent from the following detailed description, the accompanying drawings, and the appended claims.

BRIEF DESCRIPTION OF THE DRAWINGS

In the Figs: 1—water receiving pipe; 3—first water reservoir; 4—control device; 5—rain sensor; 6—intake pump; 7—rice field; 8—regulating gate; 9—second water reservoir; 10—reflux pump; 11—transcendental pipe; 12—emptying gate; 13—second gate valve; 14—first water level detection device; 15—second water level detection device; 16—third water level detection device; 17—third gate valve; 18—contaminant concentration detection device.

DETAILED DESCRIPTION OF THE PREFERRED EMBODIMENT

Further description of the present invention is illustrated by combining with the accompanying drawings and the case. Especially, one skilled in the art will understand that the embodiment of the present invention as shown in the drawings and described above is exemplary only and not intended to be limiting.

Figure 1:
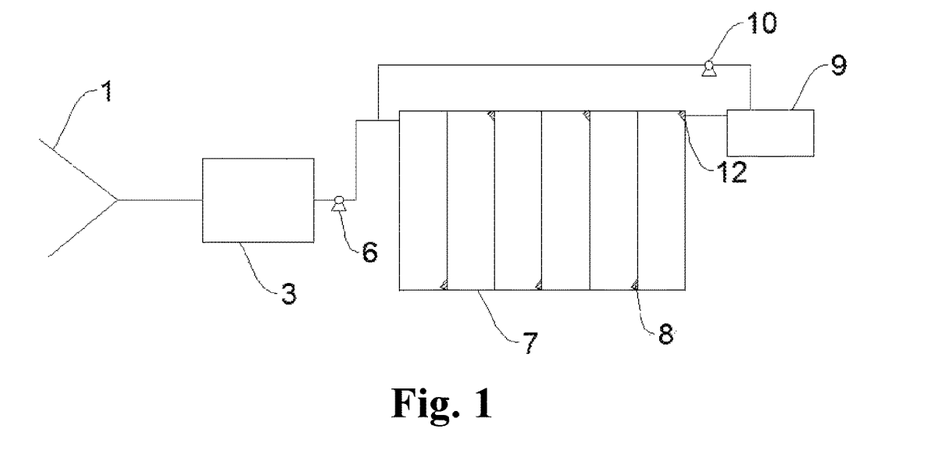
FIG. 1 is a sketch view of an integrated device for eliminating initial runoff pollution.

According to a preferred embodiment of the present invention, as shown in FIG. 1, an integrated eliminating device for initial runoff pollution comprises: a plurality of water receiving pipes 1, a first water reservoir 3, a control device 4, a intake pump 6, a rice field 7, regulating gates 8, a second water reservoir 9, a reflux pump 10; emptying gate 12, wherein the plurality of the water receiving pipes 1 for collecting initial runoff are gathered and connected with the first water reservoir 3. The starting point of the water receiving pipes 1 can be set on initial runoff where is easy to generate high concentration contaminants, such as vegetable plot, bamboo forest and livestock and poultry raising field, wherein gravity outflow manner is adopted, and pump station is adopted in the form of pumping when a low-lying ground appeared. The water receiving pipes 1 can be in a form of an open channel or a PVC pipe. One end of the intake pump 6 is connected with the first water reservoir 3, and the other end of the intake pump 6 is connected with a water inlet of the rice field 7, so as to serve as a power of water inlet. The rice field in a conventional cultivated state is divided into a plurality of sub-parcels in shapes of long stripes, adjacent sub-parcels are separated by 15-25 cm ridges and the regulating gates 8 are provided on each of the ridges with two adjacent sub-parcels. The regulating gate 8 can be switched on/off according to the actual station, so as to regulate the water level of two adjacent sub-parcels. The regulating gates 8 are in staggered arrangement, which is set on different side edge to make water inlet a 'bow' shaped direction and the initial runoff flow into the outlet through the longest distance. The plurality of the regulating gates 8 are switched on/off coordinately or separately. Under regular conditions, all of the regulating gates 8 are in opening state, the runoff flows in a 'bow' shape circulation only when different parcels require different irrigation patterns or different plants require different water levels to control the water level independently. An outlet of the rice field 7 is connected with the second water reservoir 9, the second water reservoir 9 is connected with the water inlet opening of the rice field 7 via the reflux pump 10. In addition, the control device can be set as central control in network achieved by single-chip, PLC and so on to control each devices.

Figure 2:
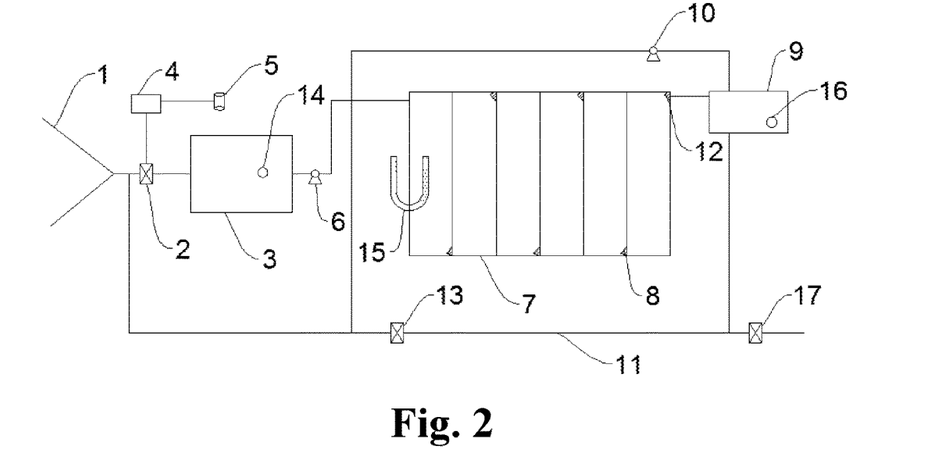
FIG. 2 is a sketch view of the integrated device for eliminating initial runoff pollution with a transcendental pipe.

In addition, a water level detection device can be provided in each of the water reservoirs and the water level detection device, so as to achieve automatic irrigation and drainage control. As shown in FIG. 2, the first water level detection device 14 is provided in the first water reservoir 3, the second water storage detection device (15) is provided in the rice field 7, the third water level detection device 16 is provided in the second water reservoir 9; the control device 4 is connected with the regulating gate 8, the intake pump 6; the reflux pump 10, the emptying gate 12, the first water level detection device 14, the second water level detection device 15 and the third water level detection device 16, so as to control operating state thereof. When the runoff water discharged by the rice field 7 has a higher concentration, the runoff water can be used to reflux or irrigate other farmland.

According to another preferred embodiment of the present invention, as shown in FIG. 2, in order to prevent overflow of the water reservoir and the rice field during rainstorm period, a rain sensor 5 connected with the control device 4 is provided in the system, so as to sense rainfall in a real time and feedback to the control device 4 to regulate operating states of devices such as each gate valve and pump, so as to adjust the accumulation, emission or deployment of the runoff A first gate valve 2 for controlling water inlet is provided between the water receiving pipes 1 and the first water reservoir 3, wherein the first gate valve 2 is controlled by the control device. When the first gate valve 2 is turned on, runoffs in the water receiving pipes 1 can flow into the first water reservoir directly 3. The water receiving pipes 1 on the front end if the first gate valve 2 is connected with the transcendental pipe 11. The second gate valve 13 and the third gate valve 17 which are controlled by the control device 4 are provided on the transcendental pipe 11. The transcendental pipe 11 between the second gate valve 13 and the third gate valve 17 is connected with the second water reservoir 9. When the first gate valve 2 is turned off, the runoff flows into the rice field 7; when the second gate valve 13 is on, the runoff continuously passes through the second gate valve 13. Then when the second gate valve is off, the runoff flows into the second water reservoir 9. When the second gate valve 13 is on, the runoff is discharged directly to flow into peripheral water body.

Figure 3:
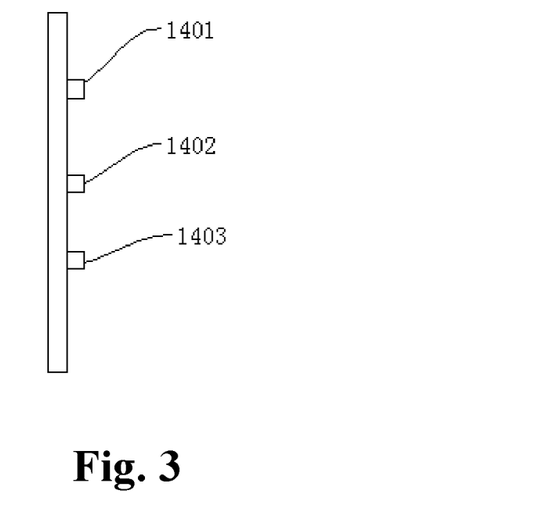
FIG. 3 is a structural sketch view of a first water level detection device of the present invention.
Figure 4:
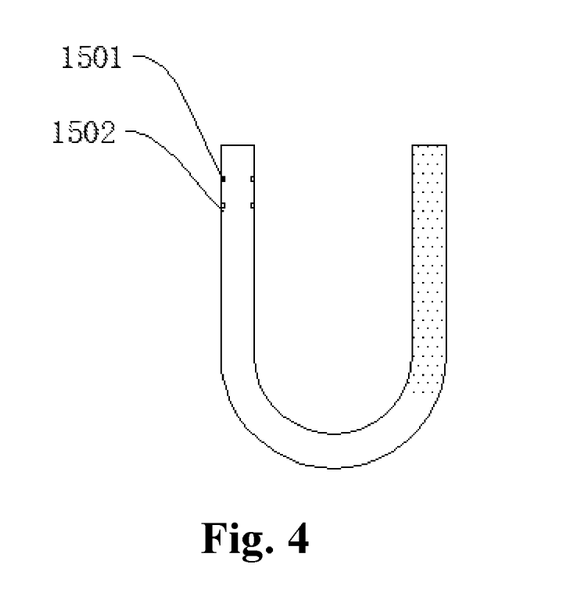
FIG. 4 is a first structural sketch view of a second water level detection device of the present invention.
Figure 5:
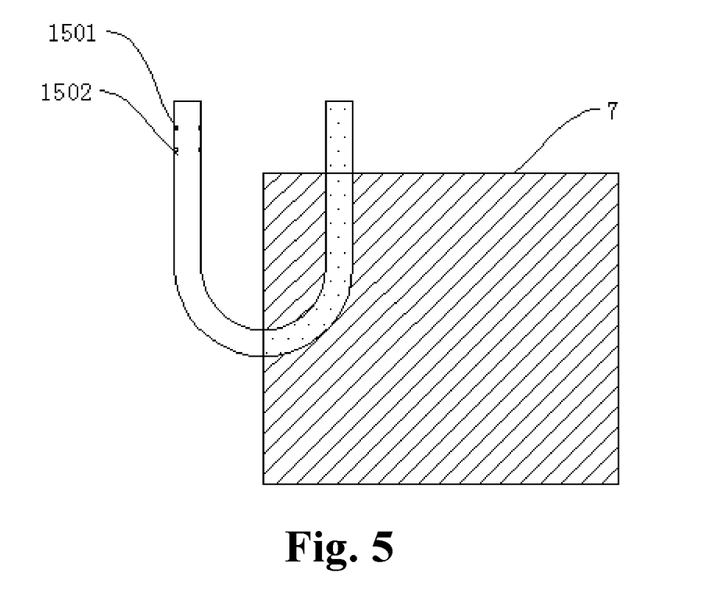
FIG. 5 is a sketch view showing an installation manner of the second water level detection device.

The water level detection device can be achieved using liquid level meter in a pressure type, an ultrasonic type or a photoelectric type. According to another preferred embodiment of the present invention, as shown in FIG. 3, in order to achieve an automatic network irrigation based on water level, the first sensor 1401, the second sensor 1402 and the third sensor 1403 are provided on the first water level detection device 14; wherein the first sensor 1401, the second sensor 1402 and the third sensor 1403 are respectively positioned on a height of an upper limit water level, a starting water level and a lower water level of the first water reservoir 3. The upper limit water level is a corresponded to a maximum safe capacity of the first water reservoir 3. The lower limit water level is the lowest water level for irrigation of the first water reservoir 3. The starting water level is between the upper limit water level and the lower limit water level. When the water level reaches this level, the intake pump 6 is started to pump water in the first water reservoir 3 into the rice field 7 for irrigation, so as to maintain a certain capacity of the water reservoir. Setting the starting water level transfers the runoff in storage to the rice field in time during the process of the runoff, so as to leave more storage capacity for possible high-concentration initial runoff Meanwhile, as shown in FIG. 4 and FIG. 5, the second water level detection device 15 adopts a U-shaped pipe, opening a hole on one side of a pipe wall of the second water level detection device 15 and embedding this part into the rice field soil; and the other side thereof is suspended outside the ridge; the fourth sensor 1501 and the fifth sensor 1502 are provided on the other suspended side on the second water level detection device 15; wherein the fourth sensor 1501 is provided at 5-8 cm above a ground surface, wherein this height is roughly corresponded to a maximum flooding height of the rice field, when the rice field is planted by flooding manner, the maximum floodable height can be determined according to experiments to regulate the value; wherein the fifth sensor 1502 is provided at 2-4 cm above the ground surface, wherein this height is roughly corresponded to a minimum floodable height of the rice field, and the value can be determined regulated by experiments according to different planting manner or flooding manner. When one side with openings of the U-shaped pipe type second water level detection device 15 is embedded into soil, a gauze can be wrapped outside for filtering soil particles. The U-shaped tube can ensure that the water level on a side with sensors provided consists with the water level of the soil, so as to make measurement of the water level of the soil more accurate.

Figure 6:
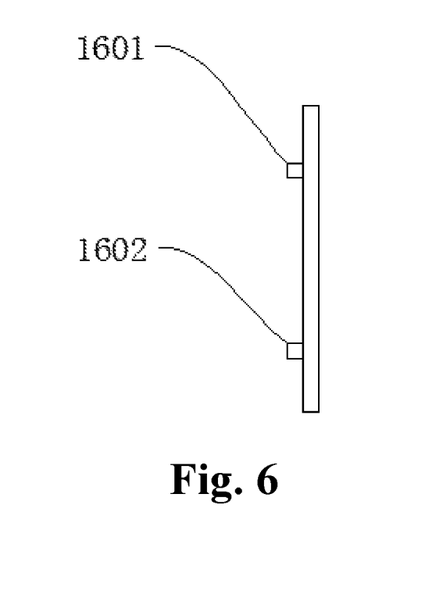
FIG. 6 is a structural sketch view of a third water level detection device of the present invention.

As shown in FIG. 6, the sixth sensor 1601 and the seventh sensor 1602 are provided on the third water level detection device 16, and respectively provided on an upper water level and a lower water level of the second water reservoir 9, wherein the upper limit water level is a height of water level corresponding to a maximum safety capacity received by the second water reservoir 9; the lower limit water level is the lowest height of the second water reservoir 9 for irrigation. One or more of the three above types of water level detection device can be utilized according to actual situation.

The first water reservoir 3 and the second water reservoir 9 can based on natural ponds or rivers to reduce damages to the ecological environment and maximize the utilization of the local environment.

The specific technique characters in the preferred embodiments mentioned above can be combined. However, combining the integrated eliminating device in FIG. 2 and the sensors in FIGS. 3-6, a preferred optimization device of the present invention is achieved. Based on the device, an integrated method for eliminating initial runoff pollution utilizing the integrated eliminating device is further provided, comprising following steps of:

(1) disposing the water receiving pipes 1 in the initial runoff catchment to make the initial runoff in the catchment converge into the first water reservoir (3);

(2) presetting the first gate valve closed in an initial state, the regulating gates 8 all turned on and the emptying gate 12 turned off;

(3) when the rain sensor 5 detects that current rainfall reaches a preset starting value and that the water level of the first water reservoir 3 does not reach a first sensor 1401 on the first water level detection device 14, switching on the first gate valve 2 by the control device 4, so as to discharge the initial runoff in the water receiving pipes (1) into the first water reservoir 3 for storage;

when the rain sensor (5) detects that current rainfall reaches the preset starting value and the water level of the first water reservoir (3) reaches the first sensor (1401) on the first water level detection device (14); a water level of the rice field (7) does not reach a fourth sensor (1501) on the second water level detection device (15), turning off the first gate valve (2) and the second gate valve (13), so as to discharge the initial runoff from the water receiving pipes (1) into the rice field (7);

when the rain sensor (5) detects that current rainfall reaches the preset starting value and the water level of the first water reservoir (3) reaches the first sensor (1401) on the first water level detection device (14); a water level of the rice field (7) reaches a fourth sensor (1501) on the second water level detection device (15) and a water level of the second water reservoir (9) does not reach a sixth sensor (1601) on the third water level detection device (16); turning off the first gate valve (2), turning on the second gate valve (13) and turning off the third gate valve (17) via the control device (4), so as to discharge the initial runoff from the water receiving pipes (1) into the second water reservoir (9);

when the rain sensor (5) detects that current rainfall reaches the preset starting value and the water level of the first water reservoir (3) reaches the first sensor (1401) on the first water level detection device (14); and that the water level of the rice field (7) reaches the fourth sensor (1501) on the second water level detection device (15) and the water level of the second water reservoir (9) reaches the sixth sensor (1601) on the third water level detection device (16); turning off the first gate valve (2), turning on the second gate valve (13) and the third gate valve (17) via the control device (4), so as to discharge the initial runoff from the water receiving pipes (1) directly by a transcendental pipe (11);

when the rain sensor (5) detects that current rainfall reaches a preset turn-off value, turning off the first gate valve (2), turning on the second gate valve (13) and the third gate valve (17) by the control device (4), so as to discharge the initial runoff from the water receiving pipes (1) directly by the transcendental pipe (11);

(4) when the water level of the first water reservoir 3 reaches the second sensor 1402 on the first water level detection device 14 and the water level of the rice field 7 does not reach the fourth sensor 1501 on the second water level detection device 15, starting the intake pump 6 by the control device 4 to discharge the initial runoff in the first water reservoir 3 into the rice field 7, if a plug flow treatment manner, i.e., continuously inputting water and outputting water, is adopted, the water inlet capacity must be regulated to a certain level, so as to prevent from exceeding treatment load of the ecosystem; when the water level of the first water reservoir 3 is lower than the third sensor 1403 on the first water level detection device 14, turning off the intake pump 6 by the control device 4, while a non-continuous treatment type is adopted, when the water level of the rice field 7 reaches the fourth sensor 1501 on the second water level detection device 15, the intake pump 6 is switched off by the control device 4; wherein after a certain period of time, water in the rice field 7 is discharged, and the intake pump 6 is switched on again, process is continuously cycled, and thus runoff water stored therein is for irrigation save water resources;

(5) during rainfall process, turning on/off the emptying gate 12 intermittently by the control device 4 according to the water level on a surface of the rice field 7; when the water level of the rice field 7 is over the third sensor 1501 on the second water level detection device 15, turning on the emptying gate 12 to discharge the initial runoff into the second water reservoir 9 for utilization of reflux; when the water level of the rice field 7 does not reach the fourth sensor 1501 on the second water level detection device 15, turning off the emptying gate 12; wherein during non-rainfall period, when a storage time of the runoff in the rice field 7 reaches a corresponded threshold which can be determined by experiments, it can be considered that a treatment limit of the ecosystem is reached, open the emptying gate 12 to discharge the runoff into the second water reservoir 9, then new runoff remained to be treated in the first water reservoir 3 is discharged to the rice field 7 again for treatment; wherein the continuously water inputting type and water outputting type mentioned above can be adopt as well;

(6) when the water level of the second water reservoir 9 reaches the sixth sensor 1601 on the third water level detection device 16 and the water level of the rice field 7 does not reach the fourth sensor 1501 on the second water level detection device 15, turning on the reflux pump 10 by the control device 4, when the water level of the rice field 7 reaches the fourth sensor 1501 on the second water level detection device 15, turning off the reflux pump 10 by the control device 4, so as to reflux the rice field 7 utilizing the runoff in the second water reservoir 9 continuously; when the water level of the second water reservoir 9 is lower than the seventh sensor 1602 on the third water level detection device 16, turning off the reflux pump 10 by the control device 10; wherein it is worth noting that, the runoff in the second water reservoir 9 has been through eliminating treatment of the rice field, so the contaminant concentration is weakened, thus, when the first water reservoir 3 leaves runoff, the runoff of the first water reservoir 3 should be treated preferentially, and the runoff in the second water reservoir 9 serves as a supplementary irrigation water;

(7) when the rain sensor 5 detects that current rainfall is over, turning off the first gate valve 2 and the emptying gate 12 by the control device 4, turning on the intake pump 6 and the reflux pump 10 according to the water level on the surface of the rice field 7, so as to utilize the initial runoff for irrigation to achieve function of eliminating contaminants.

The numbers of the steps mentioned above is only in a way as an embodiment, and do not represent the actual order, and the order can be optimized based on capacity utilization or runoff treatment efficiency.

The preset starting value is a rainfall amount which leads the initial runoff to generate in the initial runoff catchment, wherein the preset starting value can be determined by a rainfall-runoff experiment; the preset turn-off value is set as a rainfall amount which is capable of making a concentration of the contaminants of the initial runoff generated in the initial runoff catchment 2-5 times of a concentration of contaminants in the rainfall, wherein under this concentration, contaminants in the runoff will not cause much harm to the water body, and because of the low concentration, treatment efficiency of the paddy wetland system is not high, and the contaminants can be discharged directly.

Figure 7:
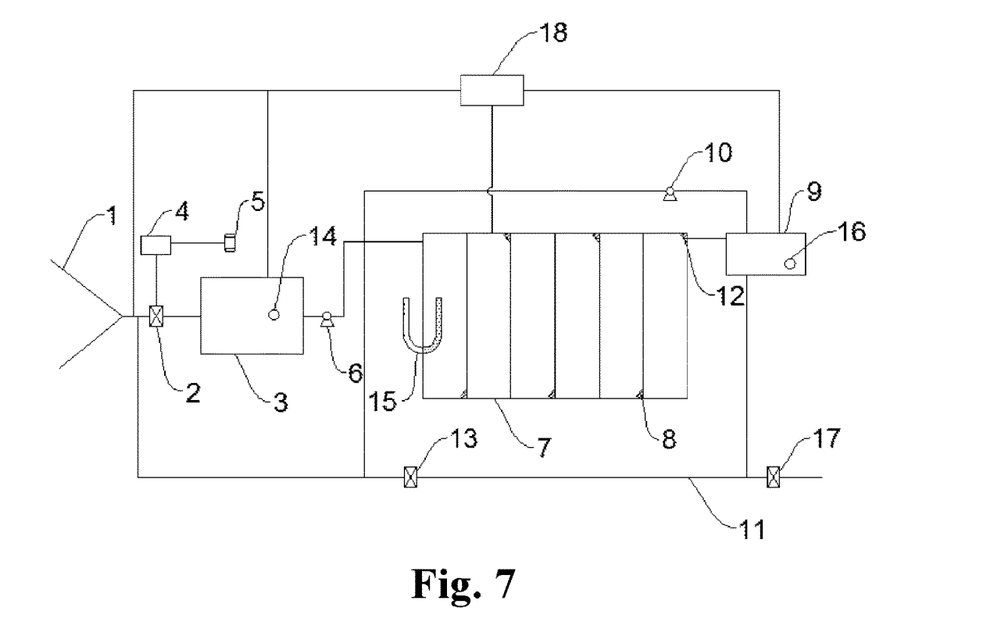
FIG. 7 is a sketch view of the integrated device for eliminating initial runoff pollution with a contaminant concentration detection device.

Furthermore, in another preferred embodiment of the present invention, based on the integrated eliminating device shown in the FIG. 2, a contaminant concentration detection device 18 is further provided. As shown in FIG. 7, a gathered position of the water receiving pipes 1, the first water reservoir 3, the rice field 7 and the second water reservoir 9 are connected with the contaminant concentration detection device 18, so as to detect contaminant concentration of the runoff at each position. The contaminant concentration detection device 18 can adopt an automatic integrated environmental water quality monitoring system. By water sampling pipe, water samples at different monitor points are delivered to the monitoring system for analysis. A distributed automatic water quality monitoring system or a contaminant sensing probes can be adopted as well, so as to analyze contaminant concentration of the water at different monitoring points.

Thus, the water level in the two reservoirs and the paddy fields can be sensed by different water level detection devices, and the runoff concentration of the different sections can be obtained by the contaminant concentration detection device 18 (the runoff concentration in the present invention refers to the contaminants Concentration, the same below), by adjusting the switch of the pump and gate valve, the flow of water accumulation, emissions or scheduling can be adjusted; when the storage capacity of the integrated eliminating device can meet the requirements of runoff collection, the runoff should be maximum trapped in the system and discharged after the treatment of the rice field. When the water storage capacity cannot meet the requirement of runoff collection, the runoff with high pollutant concentration can be trapped in the system, and the low-concentration runoff can be discharged. Thus, the maximum reduction of pollutants in runoff is achieved.

Based on the device of the preferred embodiment, the present invention further provides a method for maximizing elimination of initial runoff pollution utilizing the device, comprising steps of:

(1) disposing the water receiving pipes 1 in the initial runoff catchment to make the initial runoff in the catchment area converge into the first water reservoir 3;

(2) presetting the first gate valve closed in an initial state, the regulating gates 8 all turned on and the emptying gates 12 turned off;

(3) storage manner during the rainfall: when the rain sensor 5 detects that current rainfall reaches a preset starting value and that the water level of the first water reservoir 3 does not reach the first sensor 1401 on the first water level detection device 14, and the contaminant concentration detection device 18 detects that runoff concentration at a gathering position of the water receiving pipes 1 is greater than the runoff concentration in the first water reservoir 3, switching on the first gate valve 2 by the control device 4, so as to discharge the initial runoff in the water receiving pipes 1 into the first water reservoir 3 for storage;

when the rain sensor 5 detects that current rainfall reaches the preset starting value; the water level of the first water reservoir 3 reaches the first sensor 1401 on the first water level detection device 14; and that the water level of the rice field 7 does not reach the fourth sensor 1501 on the second water level detection device 15 and the contaminant concentration detection device 18 detects that runoff concentration at a gathering position of the water receiving pipes 1 is greater than a field surface water concentration of the rice field, turning off the first gate valve 2 and turning off a second gate valve 13 by the control device 4, so as to discharge the initial runoff in the water receiving pipes 1 into the rice field 7;

when the rain sensor 5 detects that current rainfall reaches the preset starting value; the water level of the first water reservoir 3 reaches the first sensor 1401 on the first water level detection device 14; and that a water level of the rice field 7 reaches a fourth sensor 1501 on the second water level detection device 15 and the water level of the second water reservoir 9 does not reach the sixth sensor 1601 on the third water level detection device 16 and the contaminant concentration detection device detects the runoff concentration at a gathering position of the water receiving pipes 1 is greater than a water sample concentration in the second reservoir 9; turning off the first gate valve 2 and the third gate valve 17, turning on the second gate valve 13 by the control device 4, so as to discharge the initial runoff in the water receiving pipes 1 into the second water reservoir 9;

when the rain sensor 5 detects that current rainfall reaches the preset starting value; the water level of the first water reservoir 3 reaches the first sensor 1401 on the first water level detection device 14; and that the water level of the rice field 7 reaches the fourth sensor 1501 on the second water level detection device 15 and the water level of the second water reservoir 9 reaches the sixth sensor 1601 on the third water level detection device 16; turning off the first gate valve 2, turning on the second gate valve 13 and the third gate valve 17 by the control device 4, so as to discharge the initial runoff in the water receiving pipes 1 directly by a transcendental pipe 11; and when the rain sensor 5 detects that current rainfall reaches a preset turn-off value and the contaminant concentration detection device detects that concentration of the runoff at a gather position of the water receiving pipes is less than the water sample concentration in the second water reservoir 9, turning off the first gate valve 2 and turning on the second gate valve 13 and the third gate valve 17 by the control device 4, so as to discharge the initial runoff in the water receiving pipes 1 directly by the transcendental pipe 11;

when the rain sensor 5 detects that current rainfall is over, turning off the first gate valve 2 and the emptying gate 12 by the control device 4, turning on the intake pump 6 and the reflux pump 10 according to the water level on the surface of the rice field 7 and the concentration detected by the contaminant concentration detection device, so as to utilize the initial runoff for irrigation to achieve function of eliminating contaminants.

(4) utilization manner of the runoff in the first water reservoir 3: when the water level of the first water reservoir 3 reaches the second sensor 1402 on the first water level detection device 14 and the water level of the rice field 7 does not reach the fourth sensor 1501 on the second water level detection device 15 and contaminants concentration detection device 18 detects that the runoff in the first water reservoir 3 has a higher concentration than that of water in the rice field 7, the intake pump 16 is started by the control device 4 to discharge the runoff in the first water reservoir to the rice field 7; The runoff eliminated by the rice filed will flow in to the second reservoir 9 to storage again and reflux according to the actual station; when contaminants concentration detection device 18 detects that the runoff in the first water reservoir 3 has a lower concentration than that of water in the rice field 7, the intake pump 16 is closed by the control device 4 to discharge the storage water through the water outlet on the first water reservoir or intake it for irrigation during the drought; when the water level of the first water reservoir 3 is lower than a third sensor 1403 on the first water level detection device 14, turning off the intake pump by the control device 4 until the next rainfall to storage water again. (5) regulation mode of the water level in the rice field 7, during the rainfall process, turning on/off the emptying gate 12 intermittently by the control device 4 according to a water level on a surface of the rice field 7; when the water level of the rice field 7 is over the third sensor 1501 on the second water level detection device 15, turning on the emptying gate 12 to discharge the initial runoff into the second water reservoir 9 for utilization of reflux; when the water level of the rice field 7 does not reach the fourth sensor 1501 on the second water level detection device 15, turning off the emptying gate 12; meanwhile, during the non-rainfall period, when a storage time of the runoff in the rice field 7 reaches a corresponded threshold which can be determined by experiments, it can be considered that a treatment limit of the ecosystem is reached, open the emptying gate 12 to discharge the runoff into the second water reservoir 9, then new runoff for treating in the first water reservoir 3 is discharged to the rice field 7 again for treatment; wherein the continuously water inputting type and water outputting type mentioned above can be adopt as well;

(6) regulation and utilization mode of water level in the second water reservoir 9: as shown above, when runoff is stored in the first water reservoir 3, firstly treating the runoff in the first water reservoir 3, and taking the runoff in the second water reservoir 9 as a recharging water for supplement; when the water level of the second water reservoir 9 reaches the sixth sensor 1601 on the third water level detection device 16 and the water level of the rice field 7 does not reach the fourth sensor 1501 on the second water level detection device 15 and the contaminant concentration detection device 18 detects that the runoff concentration in the second water reservoir 9 is greater than the water level concentration of the rice field 7, turning on the reflux pump 10 by the control device 4, when the water level of the rice field 7 reaches the fourth sensor 1501 on the second water level detection device 15, turning off the reflux pump 10 by the control device 4, so as to reflux the rice field 7 utilizing the runoff in the second water reservoir 9 continuously to save water source; when the water level of the second water reservoir 9 is lower than a seventh sensor 1602 on the third water level detection device 16, turning off the reflux pump 10 by the control device 10;

Compared with the former contaminant combined control method, the step of detecting the contaminant concentration in the runoff stored by the contaminants concentration detection device 18 is added. When the concentration of the runoff is lower than a certain value the runoff can be discharged directly, not still being stored in the system. Therefore, it is possible to keep the margin of the accumulative capacity of the entire eliminating device at the maximum possible to accumulate the high initial runoff.

Figure 8:
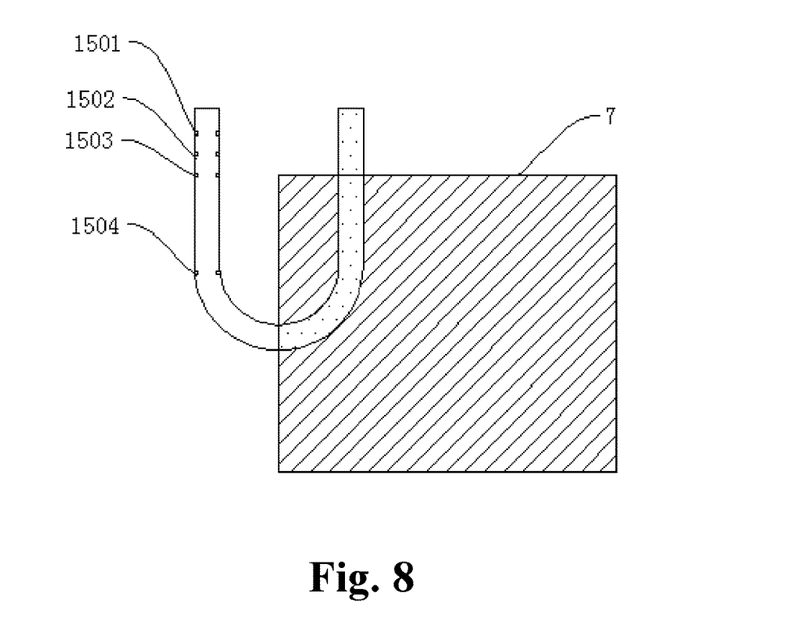
FIG. 8 is a second structural sketch view of a second water level detection device of the present invention.

In addition, in other preferred embodiments, the rice fields of the present invention may also employ different irrigation modes, such as dry and wet alternating irrigation (AWD). Therefore, it is conceivable to adjust the second water level detecting device of the present invention. FIG. 8 is another structural sketch view of the second water level detecting device. Four sensors are provided on a suspended side of the pipe body of the second water level detection device and are all used for sensing the water level. The two sensors on an upper part have an identical effect with the device in the FIG. 2. From top to bottom, the third sensor is capable of keeping flush with the soil surface for sensing the surface position of the soil. The sensor at a lowest part is provided 13-15 cm below the ground surface, that is, because under a general AWD irrigation mode, the soil water level falls to this range and re-irrigation is needed to restore the state maintaining the surface water.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. An integrated eliminating device for initial runoff pollution, comprising: a plurality of water receiving pipes (1), a first water reservoir (3), a control device (4), an intake pump (6), a rice field (7), regulating gates (8), a second water reservoir (9), a reflux pump (10); an emptying gate (12), a first water level detection device (14), a second water level detection device (15) and a third water level detection device (16);

wherein the plurality of the water receiving pipes (1) for collecting initial runoff are communicated and connected with the first water reservoir (3), a first end of the intake pump (6) is connected with the first water reservoir (3), and a second end of the intake pump (6) is connected with an water inlet opening of the rice field (7);

the rice field (7) is divided into a plurality of sub-parcels in a shape of long stripes, each of the regulating gates (8) is provided on each ridge of two adjacent sub-parcels, the regulating gates (8) are in staggered arrangement, so as to ensure that initial runoff flowed into the water inlet opening is not capable of being discharged until flows across a longest distance;

an outlet of the rice field (7) is connected with the second water reservoir (9), the second water reservoir (9) is connected with the water inlet opening of the rice field (7) via the reflux pump (10); the first water level detection device (14) is provided in the first water reservoir (3), the second water detection device (15) is provided in the rice field (7), the third water level detection device (16) is provided in the second water reservoir (9); the control device (4) is connected with all of the regulating gates (8), the intake pump (6), the reflux pump (10), the emptying gate (12), the first water level detection device (14), the second water level detection device (15) and the third water level detection device (16) and used to control their operating state;

wherein the integrated device for eliminating initial runoff pollution further comprises: a first gate valve (2), a transcendental pipe (11), a second gate valve (13), a third gate valve (17), a contaminant concentration detection device (18), and a rain sensor (5) connected with the control device (4); wherein the contaminant concentration detection device (18) is connected with a communication position of the water receiving pipes (1), the first reservoir (3), the rice field (7) and the second water reservoir (9), so as to detect runoff contaminant concentration at each position; the first gate valve (2) for controlling water inlet is provided between the water receiving pipe (1) and the first water reservoir (3), the first gate valve (2) is controlled by the control device (4); the water receiving pipe (1) on a front end of the first gate valve (2) is connected with the transcendental pipe (11), the second gate valve (13) and the third gate valve (17) which are controlled by the control device (4) are provided on the transcendental pipe (11), the transcendental pipe (11) on a front end of the second gate valve (13) is connected with the water inlet opening of the rice field; the transcendental pipe (11) between the second gate valve (13) and the third gate valve (17) is connected with the second water reservoir (9).

2. The integrated device for eliminating initial runoff pollution, as recited in claim 1, wherein a first sensor (1401), a second sensor (1402) and a third sensor (1403) are provided on the first water level detection device (14); The first sensor (1401), the second senor (1402) and the third sensor (1403) are respectively positioned on a height of an upper limit water level, a starting water level and a lower water level of the first water reservoir(3);

wherein the second water level detection device (15) adopts a U-shaped pipe and has a hole on a first side of a pipe wall of the second water level detection device (15), the second water level detection device (15) is for being embedded into the rice field soil; while a second side thereof is suspended outside the ridge; a fourth sensor (1501) and a fifth sensor (1502) are provided on the second side which is suspended of the pipe in the second water level detection device (15); wherein the fourth sensor (1501) is located at 5-8 cm above a ground surface, and the fifth sensor (1502) is located at 2-4 cm above the ground surface;

wherein a sixth sensor (1601) and a seventh sensor (1602) are provided in the third water level detection device (16), and respectively located on an upper water level and a lower water level of the second water reservoir (9).

3. An integrated method for eliminating initial runoff pollution utilizing the integrated eliminating device as recited in claim 2, comprising steps of:

(1) disposing the water receiving pipes (1) in a catchment of the initial runoff to make the water receiving pipes (1) converge into the first water reservoir (3);

(2) presetting the first gate valve to close in an initial state, the regulating gates (8) all to open and the emptying gate (12) to close;

(3) when the rain sensor (5) detects that current rainfall reaches a preset starting value and that a water level of the first water reservoir (3) does not reach a first sensor (1401) on the first water level detection device (14), switching on the first gate valve (2) by the control device (4), so as to discharge the initial runoff from the water receiving pipes (1) into the first water reservoir (3) for storage;

when the rain sensor (5) detects that current rainfall reaches the preset starting value and the water level of the first water reservoir (3) reaches the first sensor (1401) on the first water level detection device (14); a water level of the rice field (7) does not reach a fourth sensor (1501) on the second water level detection device (15), turning off the first gate valve (2) and the second gate valve (13), so as to discharge the initial runoff from the water receiving pipes (1) into the rice field (7);

when the rain sensor (5) detects that current rainfall reaches the preset starting value and the water level of the first water reservoir (3) reaches the first sensor (1401) on the first water level detection device (14); a water level of the rice field (7) reaches a fourth sensor (1501) on the second water level detection device (15) and a water level of the second water reservoir (9) does not reach a sixth sensor (1601) on the third water level detection device (16); turning off the first gate valve (2), turning on the second gate valve (13) and turning off the third gate valve (17) via the control device (4), so as to discharge the initial runoff from the water receiving pipes (1) into the second water reservoir (9);

when the rain sensor (5) detects that current rainfall reaches the preset starting value and the water level of the first water reservoir (3) reaches the first sensor (1401) on the first water level detection device (14); and that the water level of the rice field (7) reaches the fourth sensor (1501) on the second water level detection device (15) and the water level of the second water reservoir (9) reaches the sixth sensor (1601) on the third water level detection device (16); turning off the first gate valve (2), turning on the second gate valve (13) and the third gate valve (17) via the control device (4), so as to discharge the initial runoff from the water receiving pipes (1) directly by a transcendental pipe (11);

when the rain sensor (5) detects that current rainfall reaches a preset turn-off value, turning off the first gate valve (2), turning on the second gate valve (13) and the third gate valve (17) by the control device (4), so as to discharge the initial runoff from the water receiving pipes (1) directly by the transcendental pipe (11);

(4) when the water level of the first water reservoir (3) reaches a second sensor (1402) on the first water level detection device (14) and the water level of the rice field (7) does not reach the fourth sensor (1501) on the second water level detection device (15), starting the intake pump (6) by the control device (4) to discharge the initial runoff in the first water reservoir (3) into the rice field (7); when the water level of the first water reservoir (3) is lower than the third sensor (1403) on the first water level detection device (14), turning off the intake pump by the control device (4);

(5) during the rainfall process, intermittent opening and closing of the emptying gate (12) is regulated by the control device (4) according to the water level on a surface of the rice field (7); when the water level of the rice field (7) is over the fourth sensor (1501) on the second water level detection device (15), turning on the emptying gate (12) to discharge the initial runoff into the second water reservoir (9) for utilization of reflux; when the water level of the rice field (7) does not reach the fourth sensor (1501) on the second water level detection device (15), turning off the emptying gate (12);

(6) when the water level of the second water reservoir (9) reaches the sixth sensor (1601) on the third water level detection device (16) and the water level of the rice field (7) does not reach the fourth sensor (1501) on the second water level detection device (15), turning on the reflux pump (10) by the control device (4), when the water level of the rice field (7) reaches the fourth sensor (1501) on the second water level detection device (15), turning off the reflux pump (10) by the control device (4); when the water level of the second water reservoir (9) is lower than the seventh sensor (1602) on the third water level detection device (16), turning off the reflux pump (10) by the control device (4);

(7) when the rain sensor (5) detects that current rainfall is over, turning off the first gate valve (2) and the emptying gate (12) by the control device (4), turning on the intake pump (6) and the reflux pump (10) according to the water level on the surface of the rice field (7), so as to utilize the initial runoff for irrigation to achieve the function of eliminating contaminants.

4. The method, as recited in claim 3, wherein the preset starting value is set as a rainfall amount making the initial runoff generated in the catchment of the initial runoff; the preset closing value is set as a rainfall amount making the concentration of the contaminants generated from the catchment of the initial runoff 2-5 times of the concentration of contaminants in the rainfall.

5. An integrated eliminating device for initial runoff pollution, comprising: a plurality of water receiving pipes (1), a first water reservoir (3), a control device (4), an intake pump (6), a rice field (7), regulating gates (8), a second water reservoir (9), a reflux pump (10); an emptying gate (12), a first water level detection device (14), a second water level detection device (15) and a third water level detection device (16);

wherein the plurality of the water receiving pipes (1) for collecting initial runoff are communicated and connected with the first water reservoir (3), a first end the intake pump (6) is connected with the first water reservoir (3), and a second end of the intake pump (6) is connected with an water inlet opening of the rice field (7);

the rice field (7) is divided into a plurality of sub-parcels in a shape of long stripes, each of the regulating gates (8) is provided on each ridge of two adjacent sub-parcels, the regulating gate (8) are in staggered arrangement, so as to ensure that initial runoff flowed into the water inlet opening is not capable of being discharged until flows across a longest distance;

an outlet of the rice field (7) is connected with the second water reservoir (9), the second water reservoir (9) is connected with the water inlet opening of the rice field (7) via the reflux pump (10); the first water level detection device (14) is provided in the first water reservoir (3), the second water detection device (15) is provided in the rice field (7), the third water level detection device (16) is provided in the second water reservoir (9); the control device (4) is connected with the regulating gates (8), the intake pump (6), the reflux pump (10), the emptying gate (12), the first water level detection device (14), the second water level detection device (15) and the third water level detection device (16) and used to control their operating state;

wherein the integrated eliminating device for initial runoff pollution further comprises: a rain sensor (5) connected to the control device (4), a first gate valve (2) for controlling influent is provided between the water receiving pipe (1) and the first water reservoir (3), wherein the first gate valve (2) is controlled by the control device (4);

wherein the water receiving pipe (1) on the front end of the first gate valve (2) is connected with a transcendental pipe (11), a second gate valve (13) and a third gate valve (17) regulated by the control device (4) are provided on the transcendental pipe (11), the transcendental pipe (11) on the front end of the second gate valve (13) is connected with the water inlet opening of the rice field (7); the transcendental pipe (11) between the second gate valve (13) and the third gate valve (17) is connected with the second water reservoir(9).

\* \* \* \* \*